United States Patent
Chang et al.

(10) Patent No.: US 12,126,049 B2
(45) Date of Patent: Oct. 22, 2024

(54) BATTERY MODULE

(71) Applicant: CALB Co., Ltd., Changzhou (CN)

(72) Inventors: Zhiyuan Chang, Luoyang (CN); Xiaoyuan Du, Luoyang (CN); Lihui Chang, Luoyang (CN); Huanfei Li, Luoyang (CN); Licheng Zheng, Luoyang (CN)

(73) Assignee: CALB Co., Ltd., Jiangsu (CN)

( * ) Notice: Subject to any disclaimer, the term of this patent is extended or adjusted under 35 U.S.C. 154(b) by 0 days.

(21) Appl. No.: 17/131,619

(22) Filed: Dec. 22, 2020

(65) Prior Publication Data

US 2021/0391630 A1  Dec. 16, 2021

(30) Foreign Application Priority Data

Jun. 11, 2020 (CN) .......................... 202010528270.5
Oct. 30, 2020 (CN) .......................... 202011193122.9

(51) Int. Cl.
*H01M 50/507* (2021.01)
*H01M 50/529* (2021.01)

(52) U.S. Cl.
CPC ....... *H01M 50/507* (2021.01); *H01M 50/529* (2021.01)

(58) Field of Classification Search
CPC ................ H01M 50/20–209; H01M 50/529
See application file for complete search history.

(56) References Cited

U.S. PATENT DOCUMENTS

| 9,741,984 | B2 * | 8/2017 | Lee ..................... H01M 50/211 |
| 2022/0181733 | A1 * | 6/2022 | Seong ................ H01M 50/507 |

FOREIGN PATENT DOCUMENTS

| CN | 205319212 | | 6/2016 | |
| CN | 106410101 | | 2/2017 | |
| CN | 106803608 | A * | 6/2017 | .......... H01M 10/613 |
| CN | 209374584 | | 9/2019 | |
| CN | 111052441 | | 4/2020 | |
| EP | 2958165 | | 12/2015 | |
| EP | 3125332 | | 2/2017 | |
| KR | 20160068446 | | 6/2016 | |

OTHER PUBLICATIONS

Machine translation of CN 106803608 A (Year: 2017).*
"Search Report of Europe Counterpart Application", issued on Jun. 28, 2021, p. 1-p. 7.
"Office Action of China Counterpart Application", issued on Nov. 10, 2023, with English translation thereof, p. 1-p. 11.
"Office Action of China Counterpart Application", issued on May 1, 2024, with English translation thereof, p. 1-p. 11.
"Office Action of Europe Counterpart Application", issued on Jul. 26, 2024, p. 1-p. 4.

* cited by examiner

*Primary Examiner* — Matthew T Martin
*Assistant Examiner* — Unique Jenevieve Luna
(74) *Attorney, Agent, or Firm* — JCIP GLOBAL INC.

(57) ABSTRACT

The disclosure relates to the technical field of batteries, and provides a battery module. The battery module includes battery box elements; a reinforcing member, which is attached to the end portion of the battery box elements, and is connected to the battery box elements. When the battery box element is a cuboid as a whole, it includes two large surfaces and four small surfaces, and the end portion of the battery box element is the small surface of the battery box element.

11 Claims, 9 Drawing Sheets

BATTERY MODULE

CROSS-REFERENCE TO RELATED APPLICATION

This application claims the priority of China patent application serial no. 202010528270.5, filed on Jun. 11, 2020, and China patent application serial no. 202011193122.9, filed on Oct. 30, 2020. The entirety of the above-mentioned patent applications is hereby incorporated by reference herein and made a part of this specification.

BACKGROUND

Technical Field

The disclosure relates to the technical field of batteries, in particular to a battery module.

Description of Related Art

The battery module includes a plurality of stacked battery box elements, and each battery box element includes a battery box and at least one battery contained in the box. Two ends of the stack body formed by the battery box elements are provided with insulating end plates.

Since the insulating end plate has weak strength and there are connection and coordination error problems at all levels, this type of connection has lower connection strength. Accordingly, there is a risk of structural failure under working conditions such as impact and vibration.

SUMMARY

According to an aspect of the disclosure, a battery module is provided, which includes:

Multiple battery box elements;

A reinforcing member, which is attached to the end portions of at least two of the multiple battery box elements, and is connected with the at least two of the multiple battery box Specifically, when the battery box element is a cuboid as a whole, it includes two large surfaces and four small surfaces, and the end portion of the battery box element is the small surface of the battery box element.

BRIEF DESCRIPTION OF THE DRAWINGS

For a better understanding of the disclosure, reference may be made to exemplary embodiments shown in the following drawings. The components in the drawings are not necessarily to scale and related elements may be omitted, or in some instances proportions may have been exaggerated, so as to emphasize and clearly illustrate the features described herein. In addition, related elements or components can be variously arranged, as known in the art. Further, in the drawings, like reference numerals designate same or like parts throughout the several views.

DESCRIPTION OF THE EMBODIMENTS

Figure 1:
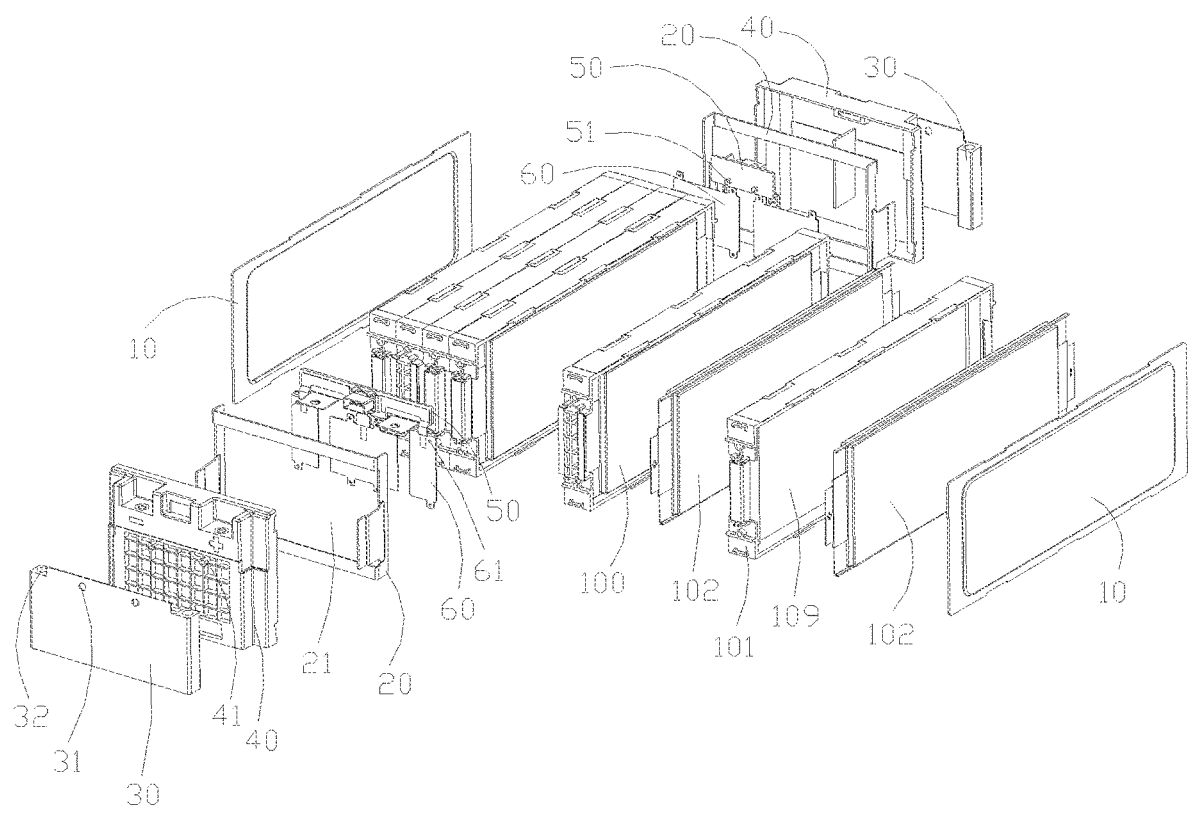
FIG. 1 is a schematic exploded diagram showing a structure of a battery module according to an exemplary embodiment.

Typical embodiments embodying the features and advantages of the present disclosure will be described in detail in the following description. It should be understood that the present disclosure can have various modifications in different embodiments, which are not deviated from the scope of the present disclosure, and the description and drawings therein are essentially for illustrative purposes, rather than limiting the present disclosure.

In the following description of the different exemplary embodiments of the present disclosure, the embodiment is carried out with reference to the accompanying drawings, which form a part of the present disclosure, and different exemplary structures, systems and steps in various aspects of the disclosure that can be implemented are shown in exemplary illustrations. It should be understood that components, structures, exemplary devices, systems, and steps of other specific solutions may be adopted, and can be structurally and functionally modified without deviating from the scope of the disclosure. Moreover, although the terms "above", "between", "within", etc. may be used in this specification to describe different exemplary features and elements of the present disclosure, these terms are used herein for convenience only, for example, to describe the exemplary direction in the drawings. In the present disclosure, the term "multiple" used herein refers to at least two. Nothing in this specification should be construed as requiring a specific three-dimensional direction of the structure to fall within the scope of the present disclosure.

An embodiment of the disclosure provides a battery module. Please refer to FIG. 1 to FIG. 9. The battery module includes: multiple battery box elements 100; a reinforcing member 20, which is attached to the end portion of at least two of the multiple battery box elements 100 and is connected to the at least two of the multiple battery box elements 100. Specifically, when the battery box element 100 is a cuboid as a whole, it includes two large surfaces and four small surfaces, and the end portion of the battery box element 100 is the small surface of the battery box element 100.

The battery module in the embodiment of the disclosure realizes the connection of the multiple battery box elements 100 through the reinforcing member 20. Since the reinforcing member 20 is directly connected to the battery box element 100, the connection strength of the multiple battery box elements 100 is improved.

An embodiment of the present disclosure further provides a battery module frame. Please refer to FIG. 1 to FIG. 7. The battery module frame includes: a side plate 10, which is adapted to be disposed on the side portion of the battery box element 100; a reinforcing member 20, which is adaptable for being attached to the end portion of at least two of the multiple battery box elements 100, and is adaptable for being connected to the at least two of the multiple battery box elements 100; and an end plate 30, which is disposed on one side of the reinforcing member 20 facing away from the battery box element 100.

The battery module frame in the embodiment of the disclosure realizes the connection of the multiple battery box elements 100 through the side plate 10, the reinforcing member 20 and the end plate 30. Since the reinforcing member 20 is directly connected to the battery box element 100, the connection strength of the multiple battery box elements 100 is improved.

An exemplary description is made with reference to the battery box element 100 in FIG. 1. Each battery box element 100 includes a battery box 101 and a battery 102 arranged in the battery box 101. The side portion of the battery box element 100 can be interpreted as the position where the large surface of the battery box element 100 is located (for example, when the battery box element 100 is a cuboid as a whole, and there are two large surfaces), that is, the large surface of the battery 102. The reinforcing member 20 is adaptable for being arranged at the end portion of the battery box element 100, that is, the side plate 10 is arranged opposite to the small surface of the battery 102.

Correspondingly, the end portion of the battery box element 100 can be interpreted as the position where the small surface of the battery box element 100 is located (for example, when the battery box element 100 is a cuboid as a whole, and there are four small surfaces). The side plate 10 is adaptable for being arranged on the side portion of the battery box element 100, that is, the side plate 10 is arranged opposite to the large surface of the battery 102.

Figure 5:
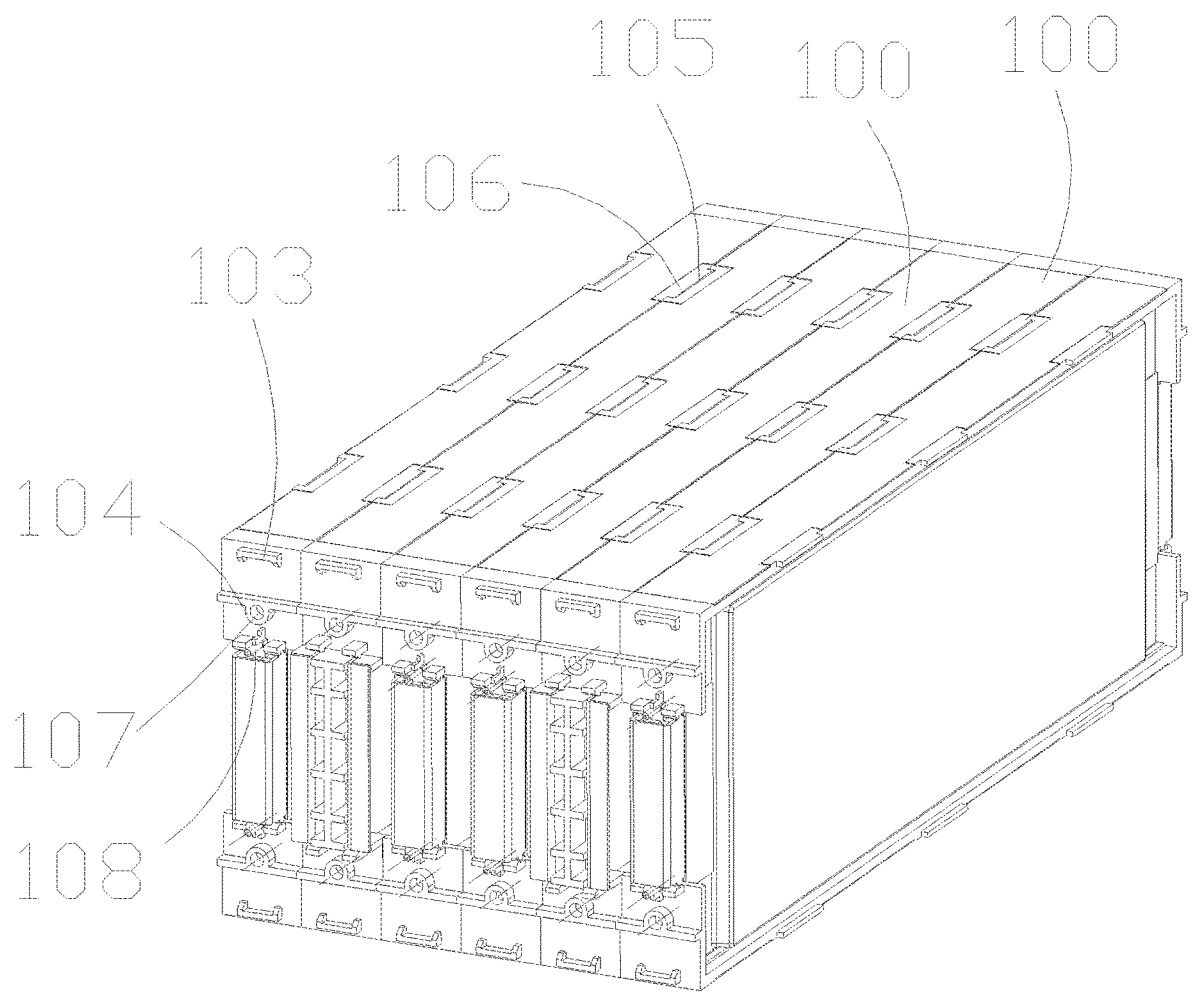
FIG. 5 is a schematic structural diagram showing multiple battery box elements of a battery module according to an exemplary embodiment.

In an embodiment, multiple battery box elements 100 are stacked, that is, the multiple battery box elements 100 form a stacked body as shown in FIG. 5. In other words, the stacked body includes two side portions and four end portions, at least one of the two side portions corresponds to the side plate 10, and at least one of the four end portions corresponds to the reinforcing member 20, and the reinforcing member 20 is connected with all the multiple battery box elements 100.

For example, there are two reinforcing members 20 and side plates 10, wherein the two reinforcing members 20 are arranged opposite to each other, and the two side plates 10 are arranged opposite to each other, so as to clamp the stacked body.

In an embodiment, the reinforcing member 20 may be made of a metal material, and its surface may be coated with an insulating layer, that is, the insulating layer may be used to prevent electrical connection from being formed between the metal part of the reinforcing member 20 and other components. Optionally, the reinforcing member 20 may be made of a polymer material with better strength, such as polyetheretherketone, as long as it can be ensured that the reinforcing member 20 has sufficient strength. The disclosure provides no limitation to the material of the reinforcing member 20, which can be chosen according to actual needs.

In an embodiment, the reinforcing member 20 is made of a metal material, that is, the reinforcing member 20 is a metal reinforcing member. The metal material can be aluminum, steel, or other metal materials, the disclosure is not limited thereto.

In an embodiment, at least one of the side plate 10 and the end plate 30 is connected to the reinforcing member 20. The arrangement of the end plate 30 further improves the connection strength of the battery module, and can be used to connect with the housing where the battery module is placed.

In an embodiment, the reinforcing member 20 is configured to connect multiple battery box elements 100, and the end plate 30 is configured to form protection for the end portion as well as connection structure of the battery module, and is combined with the side plate 10 to constitute a battery module frame that fixes the multiple battery box elements 100.

In an embodiment, the side plate 10, the reinforcing member 20, and the end plate 30 may not be directly connected, but they are connected to each other by being fixed to the housing where the battery module is arranged.

In an embodiment, a fixing hole 32 is provided on the end plate 30, and the fixing hole 32 is configured for a fastener to pass through to connect the battery module to the housing where the battery module is arranged.

Specifically, when the side plate 10 and the reinforcing member 20 are connected, the end plate 30 can be connected to any one of the reinforcing member 20 and the end plate 30, and the connection between the side plate 10, the reinforcing member 20 and the end plate 30 is realized.

Correspondingly, when the end plate 30 and the reinforcing member 20 are connected, the side plate 10 can be connected to any one of the reinforcing member 20 and the end plate 30, and the connection between the side plate 10, the reinforcing member 20 and the end plate 30 is realized.

In an embodiment, the side plate 10 and the end plate 30 are both metal structures. Optionally, at least one of the side plate 10 and the end plate 30 may be provided as a non-metal structure, such as a plastic structure.

In an embodiment, the end plate 30 and the reinforcing member 20 are both metal structures, and the two are independent structures.

In an embodiment, the end plate 30 and the reinforcing member 20 are both metal structures, and they are an integral structure.

In an embodiment, the reinforcing member 20 forms an avoiding space 21, and the avoiding space 21 is adaptable for avoiding a preset component electrically connected to the battery box element 100.

It should be noted that the end portions of the multiple battery box elements 100 need to be connected with preset components such as the collection element 50 and the bus bars 60, that is, the preset components may be but are not limited to the collection element 50 and/or the bus bars 60. In order to ensure that the reinforcing member 20 will not hinder the installation of the preset component, it is necessary to form the avoiding space 21 on the reinforcing member 20 to ensure that the preset component can pass through the avoiding space 21 and can be connected to the battery box element 100. In this manner, it can be ensured that the reinforcing member 20 will not be in contact with the preset components, and electrical insulation can be also achieved.

In an embodiment, the reinforcing member 20 is hollow to form an avoiding space 21. The avoiding space 21 may be a through hole formed on the reinforcing member 20. In actual installation, the reinforcing member 20 can be connected to the battery box element 100 first, and then preset components such as the preset components such as the collection element 50 and the bus bars 60 are connected to the battery box element 100. Alternatively, the preset components such as the collection element 50 and the bus bars 60 can be connected to the battery box element 100 first, and then the reinforcing member 20 is connected to the battery box element 100. The disclosure provides no limitation thereto, as long as the installation requirements are met.

Alternatively, the avoiding space 21 may be a recess formed on the reinforcing member 20, and the notch of the recess faces the battery box element 100, that is, the recess is an accommodating cavity, and preset components such as the collection element 50 and the bus bars 60 are arranged in the recess. In actual installation, it is necessary to first connect preset components such as the collection element 50 and the bus bars 60 to the battery box element 100, and then connect the reinforcing member 20 to the battery box element 100.

In an embodiment, the reinforcing member 20 includes: a fixing plate segment 22. Two fixing plate segments 22 are provided, and the two fixing plate segments 22 are adapted to be connected to multiple battery box elements 100. Specifically, an avoiding space 21 is formed between the two fixing plate segments 22. The fixing plate segment 22 is configured to connect multiple battery box elements 100, that is, to strengthen the connection between the multiple battery box elements 100. Under the circumstances, the avoiding space 21 is the space between the upper and lower fixing plate segments 22, and the reinforcing member 20 is also composed of two independent fixing plate segments 22.

In an embodiment, the fixing plate segments 22 are two independent plate bodies which are connected to the multiple battery box elements 100 at intervals. Under the circumstances, the fixing plate segment 22 may be connected to at least one of the side plate 10 and the end plate 30.

Figure 7:
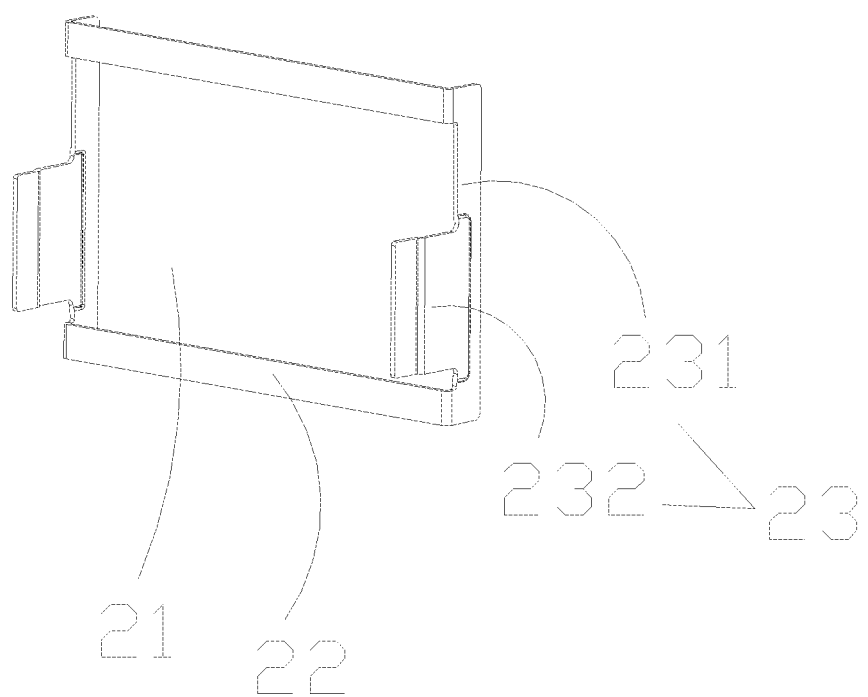
FIG. 7 is a schematic structural diagram showing a reinforcing member of a battery module according to an exemplary embodiment.

In an embodiment, as shown in FIG. 7, the reinforcing member 20 further includes: a connection plate segment 23, both ends of the connection plate segment 23 are respectively connected to two fixing plate segments 22, and an avoiding space 21 is formed between the two fixing plate segments 22 and the connection plate segment 23. Specifically, at least one of the side plate 10 and the end plate 30 is connected to the connection plate segment 23, thereby fixing the reinforcing member 20.

In an embodiment, the reinforcing member 20 includes two fixing plate segments 22 and a connection plate segment 23 connecting the two fixing plate segments 22. The two fixing plate segments 22 are configured to connect the multiple battery box elements 100, and the connection plate segment 23 can connect the reinforcing member 20 to the side plate 10 and/or the end plate 30 to enhance the connection strength of the multiple battery box elements 100.

In an embodiment, as shown in FIG. 7, the connection plate segment 23 includes: a first connection plate segment 231, and both ends of the first connection plate segment 231 are respectively connected to two fixing plate segments 22, wherein the first connection plate segment 231 and the side plate 10 are connected; the second connection plate segment 232, which is arranged on the first connection plate segment 231 and extends in a direction away from the side plate 10, wherein the second connection plate segment 232 is connected with the end plate 30. The first connection plate segment 231 and the second connection plate segment 232 connect the reinforcing member 20 to the side plate 10 and the end plate 30, thereby reliably connecting the multiple battery box elements 100 in the battery module.

In an embodiment, there are two side plates 10, and the two side plates 10 are adaptable for clamping the multiple battery box elements 100. Specifically, there are two connection plate segments 23, and an avoiding space 21 is formed between the two fixing plate segments 22 and the two connection plate segments 23. The avoiding space 21 is approximately a rectangular space. The two first connection plate segments 231 are connected to the two side plates 10 respectively, and the two second connection plate segments 232 are respectively connected to both ends of the end plate 30, and the multiple battery box elements 100 are stacked between the reinforcing member 20 and the two side plates 10, thereby realizing reliable connection.

In an embodiment, the first connection plate segment 231 is securely connected to the side plate 10, and the first connection plate segment 231 and the side plate 10 may be connected through welding, engaging or a fixing member. Correspondingly, the second connection plate segment 232 and the end plate 30 are securely connected, and the second connection plate segment 232 and the end plate 30 may be connected through welding, engaging or a fixing member.

In an embodiment, the first connection plate segment 231 is welded to the side plate 10, that is, the reinforcing member 20 is welded to the side plate 10 through the first connection plate segment 231. Correspondingly, the second connection plate segment 232 is welded to the end plate 30 so that the reinforcing member 20 is welded to the end plate 30 through the second connection plate segment 232.

Figure 2:
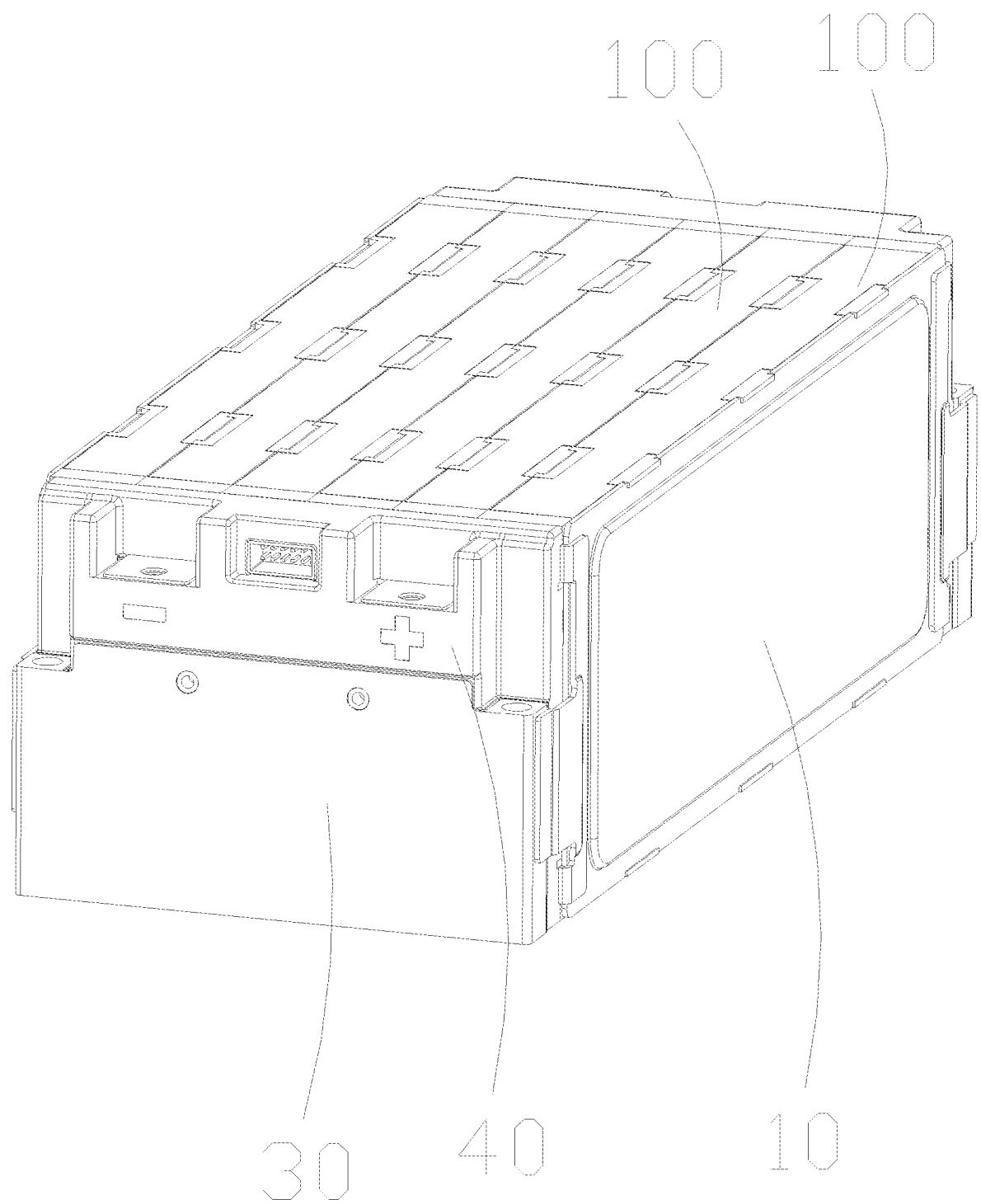
FIG. 2 is a schematic diagram showing an assembly structure of a battery module according to an exemplary embodiment.

In an embodiment, combining FIG. 1 and FIG. 2, there are two side plates 10, and the two side plates 10 are arranged opposite to each other. There are two reinforcing members 20, and the two reinforcing members 20 are arranged opposite to each other. There are two end plates 30, and the two end plates 30 are arranged opposite to each other. In this manner, it is possible to realize clamping of the multiple battery box elements 100 and ensure that the multiple battery box elements 100 can be stably and relatively fixed.

Figure 3:
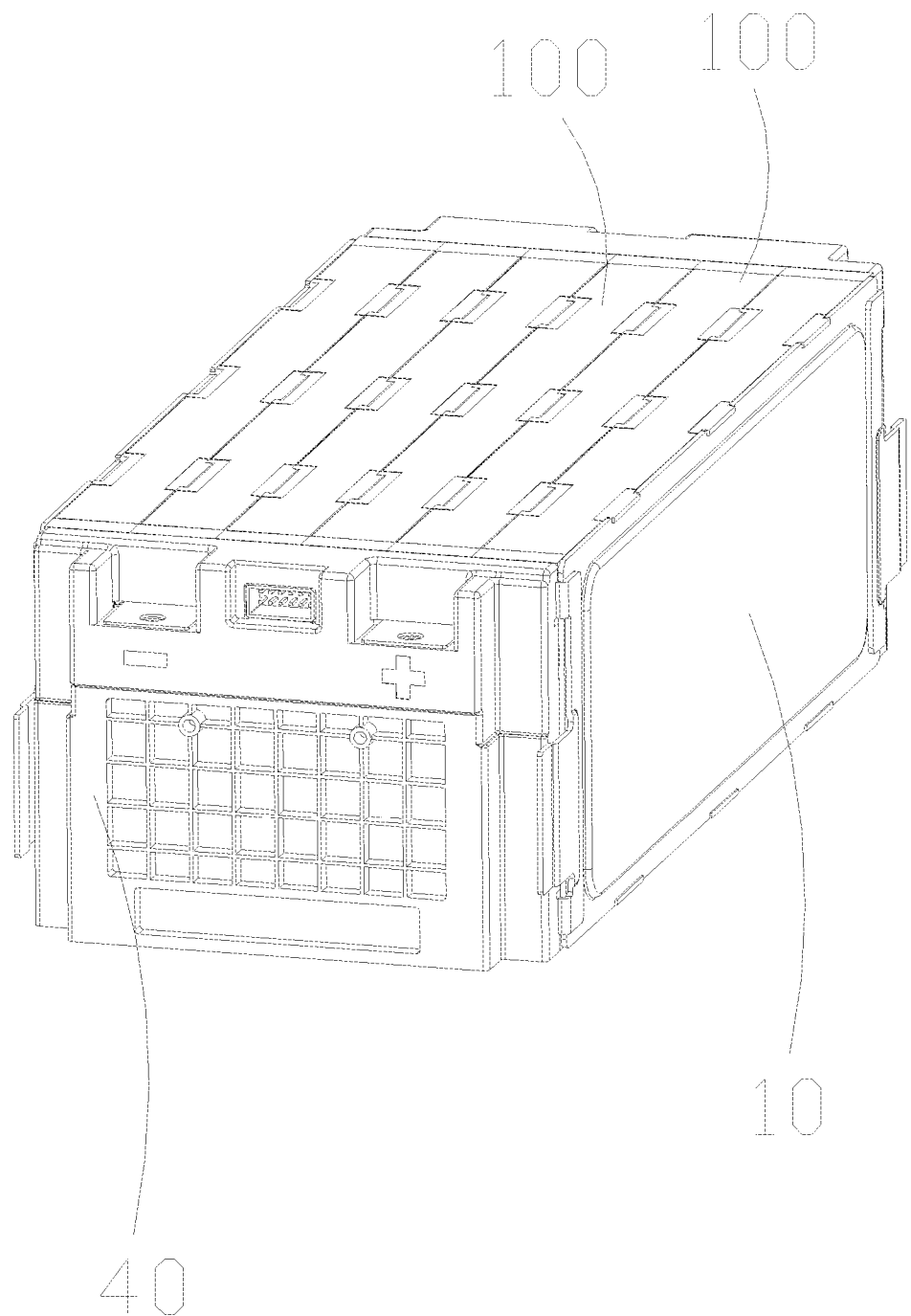
FIG. 3 is a schematic structural diagram of a battery module with end plates removed according to an exemplary embodiment.

In an embodiment, as shown in FIG. 2 and FIG. 3, the battery module further includes an insulating member 40, which is adapted to be connected to the multiple battery box elements 100 and cover the avoiding space 21. Specifically, the end plate 30 is disposed on one side of the insulating member 40 facing away from the reinforcing member 20, so as to ensure that the end plate 30 is insulated from the charged structure of the battery module, such as the connection element 50 and the bus bars 60.

In an embodiment, the insulating member 40 is adapted to be engaged with the multiple battery box elements 100; and/or the end plate 30 is engaged with the insulating member 40, which ensures a stable connection and facilitates the connection between components.

In an embodiment, as shown in FIG. 1, a third positioning portion 31 is provided on the end plate 30, a fourth positioning portion 41 is provided on the insulating member 40, and the third positioning portion 31 is connected to the fourth positioning portion 41.

Specifically, the third positioning portion 31 is a protrusion, and the fourth positioning portion 41 is a recess, and the protrusion is inserted in the recess; or, the third positioning portion 31 is a recess, and the fourth positioning portion 41 is a protrusion, and the protrusion is inserted in the recess.

In an embodiment, the third positioning portion 31 is a positioning hole, and the fourth positioning portion 41 is a positioning pillar; or, the third positioning portion 31 is a positioning pillar, and the fourth positioning portion 41 is a positioning hole.

In an embodiment, the number of the third positioning portion 31 and the number of the fourth positioning portion 41 are multiple, and they are provided corresponding to each other.

Figure 6:
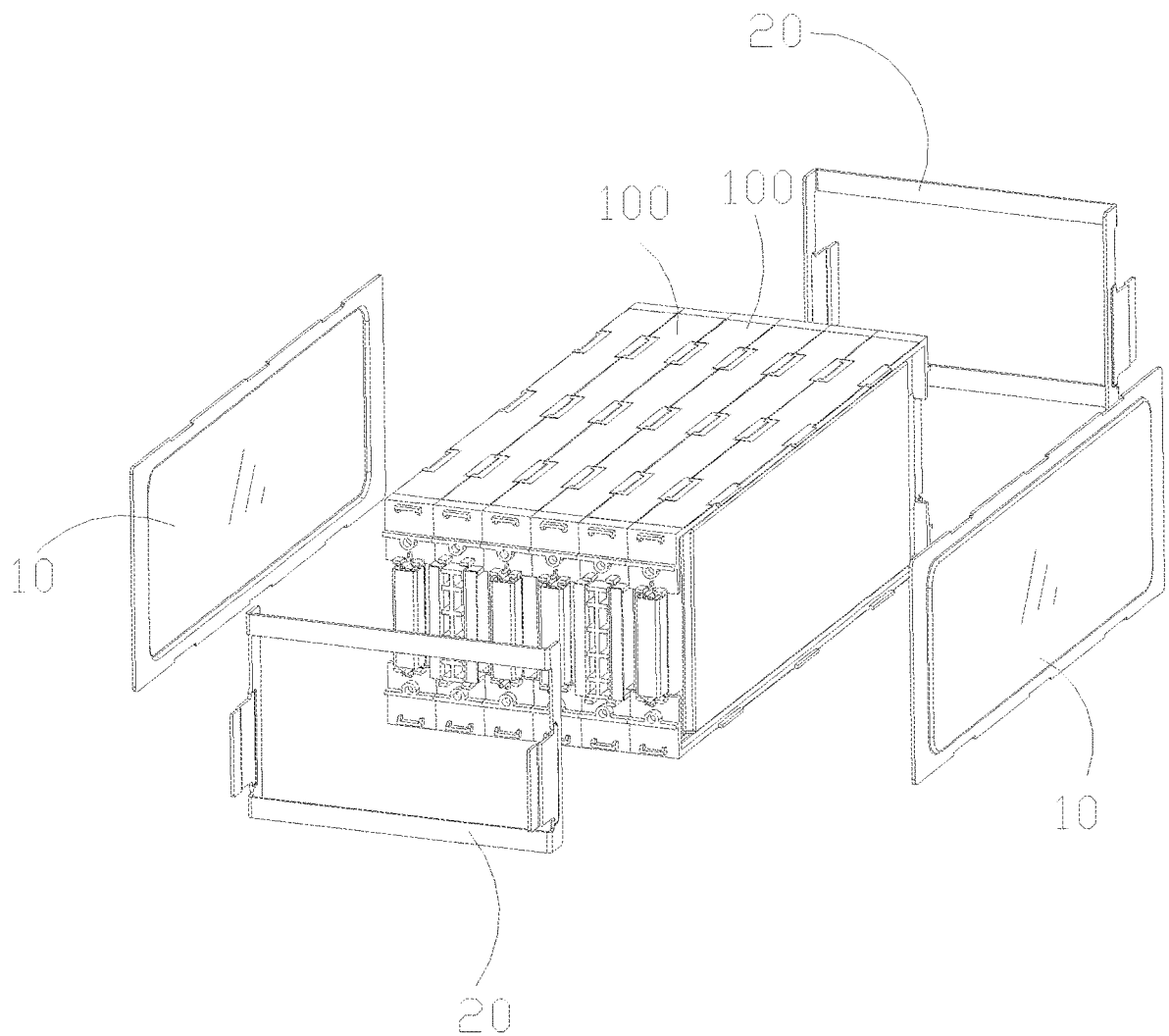
FIG. 6 is a schematic exploded diagram showing a structure of multiple battery box elements, side plates and reinforcing member of a battery module according to an exemplary embodiment.

In an embodiment, as shown in FIG. 1 and FIG. 6, there are two insulating members 40, and the two insulating members 40 are arranged opposite to each other. There are two side plates 10, and the two side plates 10 are arranged opposite to each other. There are two reinforcing members 20, and the two reinforcing members 20 are arranged opposite to each other. There are two end plates 30, and the two end plates 30 are arranged opposite to each other. The reinforcing member 20, the end plate 30 and the insulating member 40 are all provided in pairs, so that the reinforcing member 20, the end plate 30 and the insulating member 40 are provided at both ends of the multiple battery box elements 100, and an installation space for the multiple battery box elements 100 is formed between the two side plates 10.

In an embodiment, the reinforcing member 20 is formed of sheet metal, and the reinforcing member 20 has the same thickness, that is, the fixing plate segment 22, the first connection plate segment 231 and the second connection plate segment 232 have the same thickness. The fixing plate segment 22, the first connection plate segment 231 and the second connection plate segment 232 have different widths to achieve different connection effects and meet the strength requirements. Since the strength of the board can be increased by increasing the width, the thickness of the reinforcing member 20 can be made thinner so as to occupy less space.

It should be noted that the side plate 10 is a metal side plate. The reinforcing member 20 at both ends of the battery module is welded to the side plate 10 on both sides to form a metal frame. The metal frame fixes the stacked body formed by the multiple battery box elements 100 in the frame, and each battery box element 100 is directly and mechanically connected to the metal frame, so that the structure has higher strength and rigidity, and has better reliability when dealing with extreme working conditions such as vibration and impact.

An embodiment of the disclosure further provides a battery module. Please refer to FIG. 1 to FIG. 9. The battery module further includes the above-mentioned battery module frame and the multiple battery box elements 100.

The battery module in an embodiment of the disclosure can realize the connection of multiple battery box elements 100 through the side plate 10, the reinforcing member 20 and the end plate 30. Since the reinforcing member 20 is directly connected to the battery box element 100, the connection strength of the multiple battery box element 100 is improved.

In an embodiment, as shown in FIG. 1, the battery box element 100 includes: a battery box 101, which is engaged with the reinforcing member 20; and a battery 102, which is arranged in the battery box 101. The reinforcing member 20 is directly connected to the end portion of the battery box 101, and is engaged with each battery box 101 of the multiple battery box elements 100, which is not only convenient for connection and simpler operation, but also can ensure the strength of connection between the reinforcing member 20 and the multiple battery boxes 101.

Figure 4:
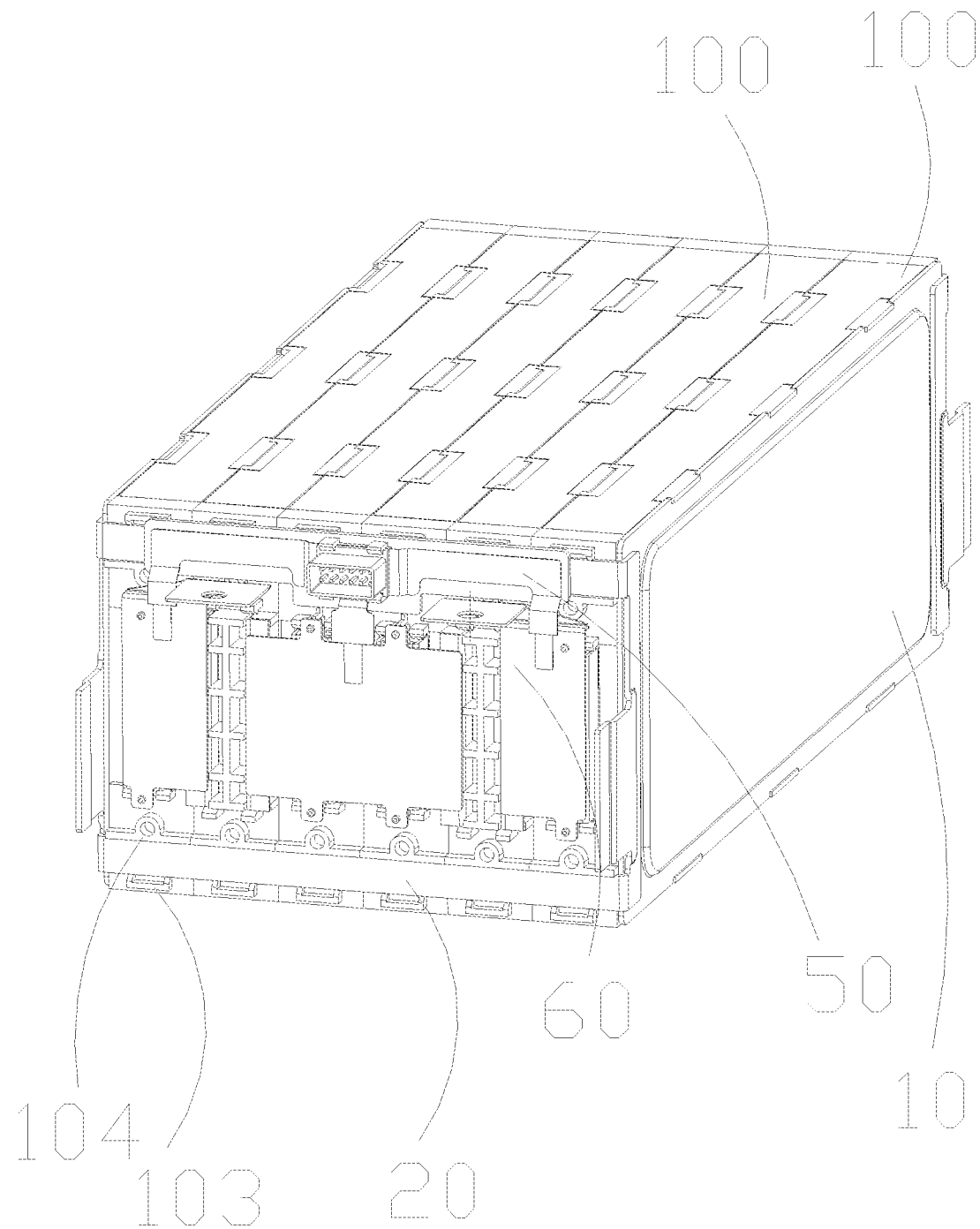
FIG. 4 is a schematic structural diagram of a battery module with end plates and insulating members removed according to an exemplary embodiment.

In an embodiment, as shown in FIG. 4 and FIG. 5, the battery box 101 is provided with a first positioning portion 103 and a second positioning portion 104, the first positioning portion 103 and the second positioning portion 104 are spaced apart, and the reinforcing member 20 is engaged between the first positioning portion 103 and the second positioning portion 104. When installing the reinforcing member 20, the first positioning portion 103 and the second positioning portion 104 realize the installation and positioning of the reinforcing member 20, that is, rapid connection is realized, and the operation is convenient.

In an embodiment, the first positioning portion 103 and the second positioning portion 104 are both protrusions, and the installation space formed between the first positioning portion 103 and the second positioning portion 104 is configured to place the fixing plate segment 22 of the reinforcing member 20. Moreover, two pairs of first positioning portions 103 and second positioning portions 104 are respectively provided on the battery box 101 for the two fixing plate segments 22 to be engaged. Specifically, the insulating member 40 is engaged with the two first positioning portions 103, that is, the insulating member 40 is in contact with the outer sides of the two first positioning portions 103, so that the insulating member 40 can be positioned through each of the first positioning portions 103 on the multiple battery boxes 101.

In an embodiment, the end surface on both ends of the battery box 101 are provided with the first positioning portion 103 and the second positioning portion 104. The first positioning portion 103 and the second positioning portion 104 are positioning protrusions, and the reinforcing member 20 is installed in the recess formed by the positioning protrusion. The reinforcing member 20 is mechanically connected to the side plates 10 installed on both sides of the stacked body of the battery box element 100 by welding. The two reinforcing members 20 and the two side plates 10 form a metal structural frame of the battery module, and fix the battery box element 100 in the structural frame. Each of the battery box elements 100 is directly fixed by the reinforcing members 20 on both ends of the battery box 101, which effectively improves the fixing strength of the battery box element 100.

It should be noted that the mechanical connection between the battery box element 100 and the reinforcing member 20 is realized through the engagement between the positioning protrusion provided on the battery box and the reinforcing member 20, and therefore it will be sufficient as long as the height of the positioning protrusion is consistent with the thickness of the reinforcing member 20, and less space will be occupied. In addition, the positioning protrusions are arranged in the same space as the conductive sheet of the battery box element 100, and the height thereof does not exceed that of the conductive sheet. Accordingly, the positioning protrusions do not increase the structural size of the battery module and improve the space utilization of the battery module.

In an embodiment, as shown in FIG. 2 to FIG. 4, the battery module further includes: an end plate 30 and an insulating member 40. The end plate 30 is disposed on one side of the reinforcing member 20 facing away from the battery box element 100; the insulating member 40 is disposed between the reinforcing member 20 and the end plate 30 and covering the end portion of the battery box element 100.

In an embodiment, the insulating member 40 is a plastic end plate, and the end plate 30 is a metal end plate. The plastic end plate is fastened on both ends of the battery box element 100 and is positioned by the first positioning portion 103 on the battery box 101. The positioning portion 103 is a positioning protrusion. The plastic end plate is configured for insulating and isolating the conductive parts of the battery module. The plastic end plate is provided with a second positioning portion 41, which is a positioning pillar and cooperates with the third positioning portion 31 provided on the metal end plate. The third positioning portion 31 is a positioning hole, such that quick installation of the metal end plate can be realized. The side surface of the metal end plate is mechanically connected to the reinforcing member 20 by welding.

In an embodiment, as shown in FIG. 1 and FIG. 4, the battery module further includes: a collection element 50 and bus bars 60. The collection element 50 and the bus bars 60 are both connected to the battery box 101 and are spaced apart from the reinforcing member 20. Specifically, the avoiding space 21 of the reinforcing member 20 is adaptable for avoiding at least one of the collection element 50 and the bus bars 60. The collection element 50 is configured to collect signals of the battery module, such as temperature signals, voltage signals, etc., and the bus bars 60 are configured to realize the series and parallel connections between each of the batteries 102.

In an embodiment, since the collection element 50 and the bus bars 60 are both conductive components, they need to be insulated from the reinforcing member 20. Therefore, the avoiding space 21 can ensure that the collection element 50 and the bus bars 60 are both connected to the battery box element 100, and can also prevent the reinforcing member 20 from contacting the collection element 50 and the bus bars 60.

In an embodiment, the thickness of the fixing plate segment 22 is less than or equal to the heights of the first positioning portion 103 and the second positioning portion 104, which can ensure that the fixing plate segment 22 will not be higher than the first positioning portion 103 and the second positioning portion 104, so as to prevent the fixing plate segment 22 from contacting the collection element 50 and the bus bars 60.

In an embodiment, at least one of the collection element 50 and the bus bars 60 is engaged with the battery box element 100. Optionally, at least one of the collection element 50 and the bus bars 60 is engaged with the battery box 101, that is, the collection element 50 and the bus bars 60 are directly connected to the battery box 101, which can reduce the installation parts.

In an embodiment, as shown in FIG. 1 and FIG. 5, the battery box 101 is provided with a first connection portion 107 and a second connection portion 108, the collection element 50 is provided with a third connection portion 51, and the bus bars 60 are provided with a fourth connecting portion 61, wherein the first connection portion 107 is connected to the third connection portion 51, and the second connection portion 108 is connected to the fourth connection portion 61.

In an embodiment, the first connection portion 107 and the third connection portion 51 are configured as protrusions and recesses, and their specific forms can be determined according to actual use. The second connection portion 108 and the fourth connection portion 61 are configured as protrusions and recesses, and their specific forms can be determined according to actual use.

In an embodiment, the first connection portion 107 is a positioning hole, the first connection portion 107 is disposed on the second positioning portion 104, and the third connection portion 51 is a positioning pillar.

In an embodiment, the second connection portion 108 is a positioning pillar, and the fourth connection portion 61 is a positioning hole.

In an embodiment, the end surfaces of both ends of the battery box 101 are provided with the first connection portion 107 and the second connection portion 108, and the first connection portion 107 and the second connection portion 108 are respectively positioning hole and positioning pillar. The rear surface of the collection element 50 is provided with the third connection portion 51, the third connection portion 51 is a positioning pillar, and the positioning pillar cooperates with the positioning hole to realize the fixing of the collection element 50. The bus bars 60 are provided with the fourth connection portion 61, the fourth connection portion 61 is a positioning hole, and the positioning hole cooperates with the positioning pillar to realize the fixing of the bus bars 60. Since the fixing structure of the collection element 50 and the bus bars 60 is directly integrated on the battery box 101, the collection element 50 and the bus bars 60 can be directly fixed on the battery box 101, saving the trouble of using a bus bar fixing frame and reducing the weight and cost of the battery module.

In an embodiment, the structures of the two first positioning portions 103 are completely the same, and the structures of the two second positioning portions 104 are also completely the same. There are two first connection portions 107 and second connection portions 108 on each of the battery boxes 101, and their structures are completely the same. Therefore, when assembling the battery module, the installation of the collection element 50 and the bus bars 60 can be completed without having to consider the placement direction of each battery box element 100. In this manner, the assembling efficiency can be improved.

In an embodiment, two adjacent battery boxes 101 are engaged to ensure that multiple battery box elements 100 are connected in sequence.

Figure 8:
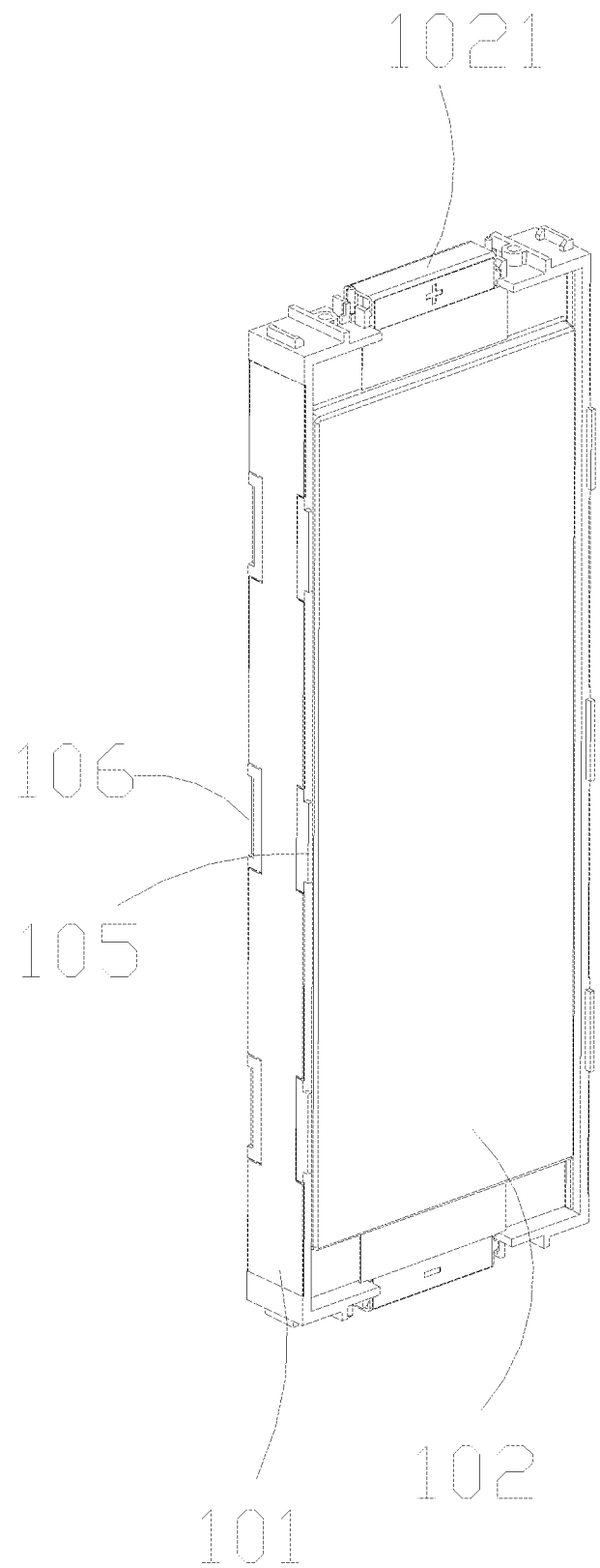
FIG. 8 is a schematic structural diagram showing a battery box element of a battery module according to an exemplary embodiment.

In an embodiment, as shown in FIG. 5 and FIG. 8, in an embodiment, a first engaging portion 105 is provided on one side of the battery box 101, and a second engaging portion 106 is provided on the other side of the battery box 101. The first engaging portion 105 is adapted for the second engaging portion 106; wherein, the first engaging portion 105 of one of the two adjacent battery boxes 101 is engaged with the second engaging portion 106 of the other battery box 101. In this manner, the positioning of the adjacent battery box 101 can be realized and the stacking and assembly efficiency of the battery box element 100 can be improved.

In an embodiment, the first engaging portion 105 and the second engaging portion 106 are configured as protrusions and recesses, and their specific forms can be determined according to actual use. Specifically, each battery box 101 is provided with at least two first engaging portions 105 and second engaging portions 106.

In an embodiment, as shown in FIG. 1, the battery box 101 includes a frame and a heat dissipation sheet 109 arranged in the frame. The heat dissipation sheet 109 is located in the middle of the frame, such that a mounting slot is formed on both sides of the frame. The two batteries 102 are arranged in the corresponding mounting slots.

In an embodiment, the battery box element 100 is composed of a battery box 101 and two batteries 102 installed therein, and the battery box 101 is composed of a plastic frame, a heat dissipation sheet 109 and a conductive sheet. The heat dissipation sheet 109 is embedded in the plastic frame when the plastic frame is injection-molded. The conductive sheet is fixed on the plastic frame by hooks provided on the plastic frame. The battery 102 is adhered to the heat dissipation sheet 109 through adhesive. The battery electrode tab is electrically connected to the conductive sheet through laser welding.

Specifically, the heat dissipation sheet 109 extends from the upper and lower surfaces of the plastic frame and is bent and attached to the upper and lower surfaces to realize heat conduction between the battery 102 and the outside of the battery module, that is, the heat dissipation sheet 109 is I-shaped as a whole (presented as the shape of the character "I").

Figure 9:
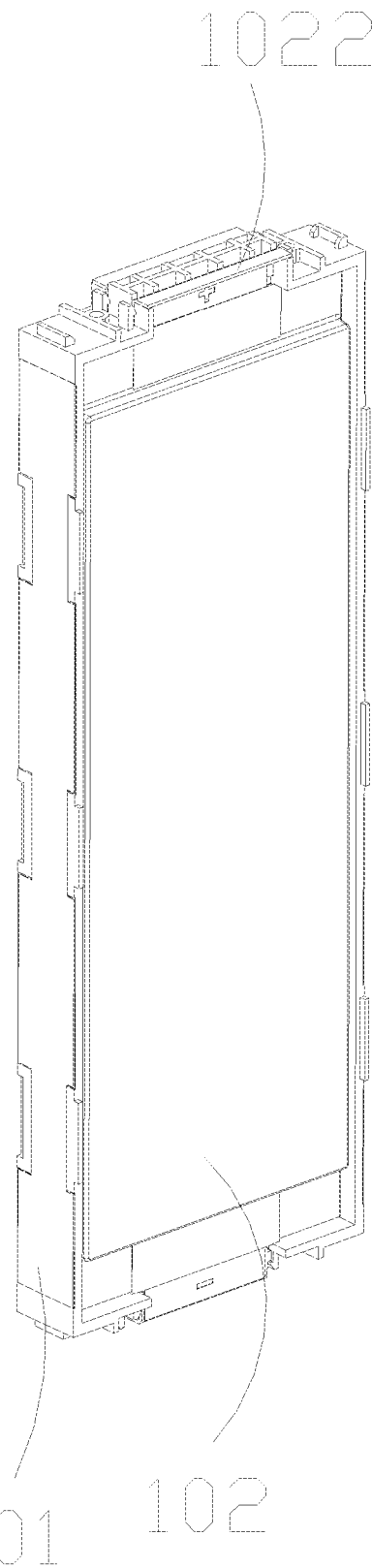
FIG. 9 is a schematic structural diagram showing a battery box element of a battery module according to another exemplary embodiment.

In an embodiment, as shown in FIG. 8 and FIG. 9, the battery box element 100 is of two types. In the battery box element 100 shown in FIG. 8, the conductive sheet is a first conductive sheet 1021, and the first conductive sheet 1021 is a U-shaped conductive sheet, which connects the two battery electrode tabs in the battery box 101 in parallel. In the battery box element 100 shown in FIG. 9, the conductive sheet is a second conductive sheet 1022, and the second conductive sheet 1022 is an L-shaped conductive sheet, and the L-shaped conductive sheet is electrically connected to only one battery electrode tab. The bus bars 60 are laser welded to the conductive sheet, and different series and parallel configurations of battery modules can be realized by setting the type and number of conductive sheets connected to the same bus bars 60. For example, if the bus bars 60 are electrically connected with one L-shaped and one U-shaped conductive sheet, a 3-parallel configuration of the battery is realized, and if the bus bars are electrically connected with two U-shaped conductive sheets, and a 4-parallel configuration of the battery is realized. The disclosure provides no limitation thereto, and the corresponding settings can be made according to actual use and requirements.

In the battery module of the disclosure, two reinforcing members 20 cooperate with two side plates 10 to form a metal frame, and the two reinforcing members 20 are securely connected to the battery box element 100, which has high strength and good reliability. The reinforcing member 20 has a plate shape and is attached to the battery box 101 without affecting other structures, occupies a small space, and improves space utilization. The reinforcing member 20 and the battery box element 100 are fixed through a positioning protrusion and a positioning hole, and the height of the positioning protrusion is greater than the thickness of the reinforcing member 20, which can isolate the collection element 50 from the reinforcing member 20. The engaging connection between the battery box element 100 and the bus bars 60 is adopted to fix the bus bars 60, which reduces the weight and cost of the battery module.

Those skilled in the art can easily think of other embodiments of the present disclosure after considering the specification and practicing the disclosure disclosed herein. The present disclosure is intended to cover any variations, uses or adaptive changes of the present disclosure. These variations, uses or adaptive changes follow the general principles of the present disclosure and include common knowledge or conventional technical means in the technical field not disclosed by the present disclosure. The description and exemplary embodiments are to be regarded as examples only, and the true scope and spirit of the present disclosure are set forth below by the claims.

It should be understood that the present disclosure is not limited to the precise structure described above and shown in the drawings, and various modifications and changes can be made without departing from its scope. The scope of the present disclosure is only limited by the appended claims.

What is claimed is:

1. A battery module, comprising:
battery box elements;
a reinforcing member, which is attached to an end portion of at least two of the battery box elements and is directly connected with the at least two of the battery box elements, wherein the reinforcing member is formed by a metal material;
a collection element and bus bars, wherein the collection element and the bus bars are both connected to the battery box elements;
an end plate, which is arranged on one side of the reinforcing member facing away from the battery box elements;
a side plate, which is arranged on a side portion of the battery box elements, wherein the side portion of the battery box elements is a large surface of the battery box elements; and
an insulating member, which is located between the reinforcing member and the end plate, and covering the end portion of the battery box elements,
wherein when each of the battery box elements is a cuboid as a whole, the battery box elements comprise two large surfaces and four small surfaces, and the end portion of the at least two of the battery box elements is the small surface of the battery box elements,
wherein the reinforcing member comprises two fixing plate segments and a connection plate segment, the two fixing plate segments are respectively connected to the battery box elements, and the end plate and the reinforcing member are independent structures,
wherein the connection plate segment comprises:
a first connection plate segment, wherein both ends of the first connection plate segment are respectively connected to the two fixing plate segments, and the first connection plate segment and the side plate are connected; and
a second connection plate segment, wherein the second connection plate segment is arranged on the first connection plate segment, and is extended toward a direction along which the battery box elements point at the end plate, and the second connection plate segment and the end plate are connected,
wherein the reinforcing member is welded to the side plate through the first connection plate segment,
wherein the reinforcing member is welded to the end plate through the second connection plate segment,
wherein the reinforcing member is engaged with the battery box elements,
wherein the two fixing plate segments are arranged at intervals, and the two fixing plate segments are respectively engaged with the battery box elements,
wherein each of the battery box elements is provided with a first positioning portion and a second positioning portion, the first positioning portion and the second positioning portion are arranged at intervals, and the fixing plate segment is engaged between the first positioning portion and the second positioning portion, and
wherein a thickness of the fixing plate segment is less than or equal to a height of the first positioning portion, and less than or equal to a height of the second positioning portion.

2. The battery module according to claim 1, wherein the reinforcing member is formed with an avoiding space, and the avoiding space can avoid the collection element and the bus bars.

3. The battery module according to claim 2, wherein the avoiding space is formed between the two fixing plate segments.

4. The battery module according to claim 3, wherein the avoiding space is formed between the two fixing plate segments and the connection plate segment.

5. The battery module according to claim 4, wherein there are two connection plate segments, and the avoiding space is formed between the two fixing plate segments and the two connection plate segments.

6. The battery module according to claim 5, wherein the number of the side plates is two, and the two side plates are arranged opposite to each other; the number of the reinforcing members is two, and the two reinforcing members are arranged opposite to each other; the number of the end plates is two, and the two end plates are arranged opposite to each other; and the two side plates, the two reinforcing members, and the two end plates constitute a frame contains and clamps the battery box elements.

7. The battery module according to claim 2, wherein at least one of the collection element and the bus bars is engaged with the battery box elements.

8. The battery module according to claim 1, wherein the insulating member is connected to the battery box elements; and the insulating member is connected to the end plate.

9. The battery module according to claim 8, wherein the insulating member is engaged with the battery box elements; and the insulating member is engaged with the end plate.

10. The battery module according to claim 9, further comprising:

a side plate, which is arranged on a side portion of the battery box elements, wherein the side portion of the battery box elements is a large surface of the battery box elements;

wherein the number of the insulating members is two, and the two insulating members are arranged opposite to each other; the number of the side plate is two, and the two side plates are arranged opposite to each other; the number of the reinforcing member is two, and the two reinforcing members are arranged opposite to each other; the number of the end plate is two, and the two end plates are arranged opposite to each other; and the two side plates, the two reinforcing members, and the two end plates constitute a frame contains and clamps the battery box elements in the battery module.

11. The battery module according to claim 1, wherein a surface of the reinforcing member is provided with an insulating layer.

* * * * *